May 23, 1939.    J. M. EVANS    2,159,324
RAILWAY SIGNALING SYSTEM
Filed June 20, 1936
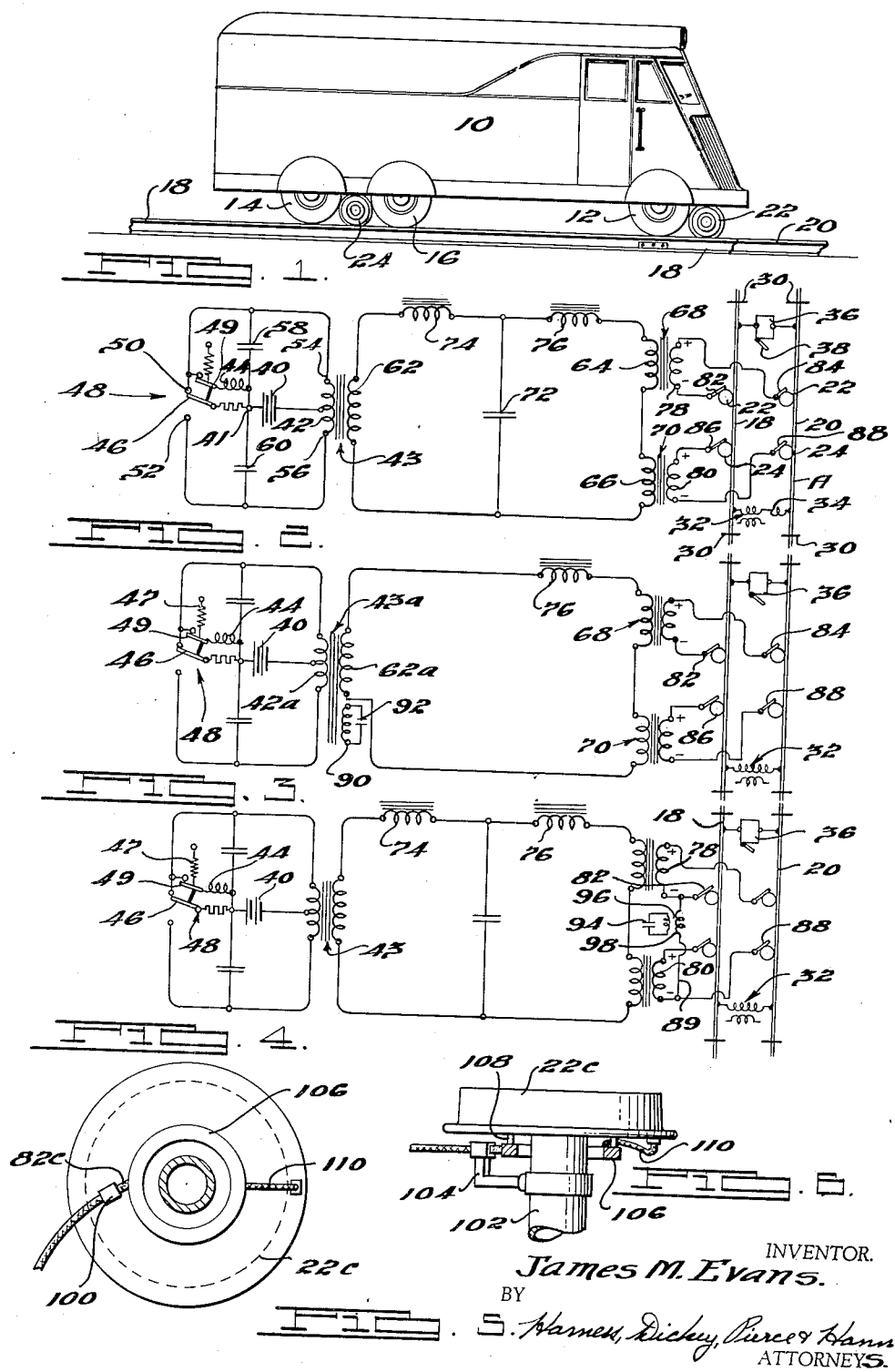
INVENTOR.
James M. Evans.
BY
Harness, Dickey, Pierce & Hann.
ATTORNEYS.

Patented May 23, 1939

2,159,324

UNITED STATES PATENT OFFICE 2,159,324

RAILWAY SIGNALING SYSTEM

James Moore Evans, Detroit, Mich., assignor to Evans Products Company, a corporation of Delaware Application June 20, 1936, Serial No. 86,328

1 Claim. (Cl. 246—34)

The present invention relates to railway signaling systems, and in particular provides an improved, simplified system for improving the shunting of track circuits by vehicles traversing the tracks.

In automatic railway signaling systems of the type in connection with which the present invention is particularly adapted for use, the operation of the crossing and other signals is controlled by the entrance and departure of vehicles into and from the block or track section with which the signals are associated. Conventionally, each block or track section is provided with a source of track circuit energy, connected across the two rails of the block adjacent one end thereof and one or more relays connected across the two rails of the track adjacent the other end of the block.

In the absence of a vehicle in the block, the relay or relays are energized by the source of track circuit energy, and provide a corresponding signal indication. The entrance of a vehicle into the block or track section is relied upon to complete a shunt circuit, as through the wheels and axles thereof, between the two rails of the block, of lower resistance than that of the track relay or relays, thereby sufficiently de-energizing them to cause them to assume a de-energized position. In being de-energized, the track relays modify the signal indication, and, in certain instances perform other control functions, such as signaling to, retarding or stopping a following train. As the vehicle leaves the particular block or section, interrupting the shunt path provided thereby, the track relay or relays again become energized and restore the signals. For purposes of the present description, the characteristic result of the entrance of a vehicle into a block or section is the de-energization of the track relay or relays associated with that section.

Where relatively heavy rolling stock is used, the weight carried by each axle and pair of wheels is found sufficient to break through any accumulated rust or ice or other deposit which may be encountered on the rails, and provide a shunt path of sufficiently low resistance to provide effective operation of the signals. In the use of relatively light weight rail cars, however, it is found that the weight carried by the wheels and axles through which the shunt circuits are intended to be provided, is insufficient to provide effective shunting and, in the absence of some auxiliary provision, signal failure frequently results. An illustrative type of such relatively light vehicle is the combined road and rail vehicle shown in Patent No. 2,002,901, granted to David W. Main on May 28, 1935, and assigned to Transportation Systems, Inc. In the patented construction, a usual pnuematic tired highway vehicle is provided with auxiliary or pilot wheels of usual flanged construction which may be selectively raised and lowered between track engaging and retracted positions. For highway travel, the pilot wheels are retracted and the vehicle traverses the highway in the conventional manner. For rail travel, the pilot wheels are lowered into track-engaging position and act to guide and maintain the pnuematic tired wheels on the rails. Usually, one pair of pilot wheels is provided adjacent the vehicle front wheels and a second pair of pilot wheels is provided adjacent the rear vehicle wheels. The previously identified shunt paths may be completed through the pilot wheels and axles.

To provide reliable operation of signals by the lighter weight vehicles, it has been proposed to provide on the vehicle, an auxiliary source of what may be called carrier current, to break down any high resistance to shunting due to rust or other causes, as by ionizing the air between the rail and the pilot wheel or other conducting element engaging the rail. Once the rust layer is broken down, the carrier current functions to maintain a circulating current in a circuit which includes the shunt path for the track or block relay or relays. The circulating current maintains the resistance of the shunt paths at a sufficiently low value to insure that the track relay or relays will be reliably de-energized. The present invention is directed to improvements upon the auxiliary track shunting systems thus far proposed, the improvements being directed both to the economy and simplicity of the elements of the auxiliary shunting device, as well as to the reliability and effectiveness thereof.

Accordingly, objects of the present invention are to provide an auxiliary track shunting device, capable of improving track shunting, which utilizes a vehicle carried source of carrier current, and which is reliable in operation, embodies relatively few and economically manufactured and assembled elements, and which may be applied to existing vehicles without further changes in the construction thereof than are involved in connecting the device into the vehicle.

Further objects of the present invention are to provide an auxiliary track shunting device which includes, as vehicle carried elements, a generating circuit, an associated adjusting circuit, and a delivery circuit; to provide such a device in which the generating circuit comprises a battery, a translating device for converting the direct current output of the battery to periodically varying or alternating current, and the primary winding of a transformer for inductively coupling the generating circuit to the adjusting circuit; to provide such a device in which the adjusting circuit includes the secondary of the just mentioned transformer, a plurality of magnetically independent primary delivery transformer windings for inductively coupling the adjusting circuit to the delivery circuit, and components of reactance and capacitance so related to each other as to produce a high delivery transformer voltage under poor shunting conditions, and a materially lower voltage under good shunting conditions; to provide such a device in which each delivery circuit includes the secondary winding of a delivery transformer, the terminals of which are electrically connected to the two rails of a track; and to provide such a device in which the connections of the delivery secondaries are such that the voltages thereof are cumulative in applying a break-down voltage to the two rails.

Further objects of the present invention are to provide a track shunting device of the above described character in which the inductive and capacitive components of the adjusting circuit may be introduced by means of a condenser connected in parallel with the secondary of the generating transformer and by means of inductances connected in series and in parallel respectively with the condenser; to provide such a device in which the capacitive and inductive components of the adjusting circuit may be introduced by means of a tertiary winding associated with the generating transformer; and to provide such a system utilizing delivery transformers of high leakage reactance to thereby produce a high break-down, low conducting, voltage relationship.

Further objects of the present invention are to provide a track shunting device of the above stated character in which the inductively independent secondaries of the delivery transformer are interconnected by a circuit which is non-resonant to the frequency of the generating circuit but which is resonant and consequently of low impedance to the trackway frequency and thus provides a low impedance shunt path between the rails which is independent of the secondaries of the delivery transformers.

Further objects of the present invention are to provide a simple and effective slip ring construction for electrically connecting the terminals of the shunt circuits with the rims of insulated pilot wheels in a combined road and rail vehicle.

With the above and other objects in view which appear in the following description and in the appended claims, preferred but illustrative embodiments of the present invention are shown in the accompanying drawing throughout the several views of which corresponding reference characters are used to designate corresponding parts, and in which:

Figure 1 is a general view in elevation of a combined road and rail vehicle to which the present invention may be applied;

Fig. 2 is a diagrammatic view of the electrical elements of the invention;

Fig. 3 is a diagrammatic view of a modified embodiment of the invention;

Fig. 4 is a diagrammatic view of a further modification of the present invention;

Fig. 5 is a view in side elevation of one of the pilot wheels of the vehicle shown in Fig. 1, and illustrating the slip ring construction; and Fig. 6 is a plan view, partly in section, corresponding to Fig. 5 and showing additional details of the slip ring construction.

Referring to Fig. 1, the illustrative vehicle shown for the purpose of disclosing the present invention is of the type shown in the previously identified Main patent, comprising a body structure 10, carried upon usual dirigible pneumatic tired front wheels 12 and a double rear truck formed of related pneumatic tires 14 and 16. The wheels 12, 14 and 16 serve in the usual way during highway travel, and, during track travel are guided upon the usual rails 18 and 20 by front and rear pilot assemblies comprising pairs of relatively small flanged wheels 22 and 24, the wheels 22 of the front pair being disposed ahead of but adjacent the front vehicle wheels 12, and the wheels 24 of the rear pair being disposed between the rear vehicle wheels 14 and 16. In the illustrated embodiment of the present invention the front and rear pairs of pilot wheels act to form the electrical connection between the vehicle and the track rails 18 and 20.

Referring to Fig. 2, the rails 18 and 20 of the tracks are shown as divided by insulating joints 30 into a track section or block designated A. Block A is illustrated as supplied with alternating current energy from a transformer 32, the primary of which may be connected to any suitable source and the secondary of which is connected, in series with a current limiting reactor 34 directly across the two rails 18 and 20, preferably adjacent one end of block A. It will be appreciated, however, that direct current may be utilized instead of the illustrated alternating current.

Adjacent the other end of block A the usual track relay 36, the armature 38 of which may be disposed to control a usual signal circuit, is directly connected across the two rails 18 and 20. In the absence of a vehicle 10 in block A, accordingly, relay 36 is continuously energized from the secondary of transformer 32 through a circuit which includes both of the rails 18 and 20 and when so energized, provides a corresponding indication of any signals or other control apparatus which may be associated with the block. If, however, a shunt path of low resistance is interposed across the rails 18 and 20, sufficient of the current from transformer 32 is diverted away from relay 36, causing the armature 38 to fall to a de-energized position, resulting in an appropriate change in the signal indication. The required low resistance shunt path is provided by the remaining apparatus shown in Figure 2, all of which is carried upon the vehicle 10 and comprises generally the previously mentioned generating, adjusting and delivery circuits.

The generating circuit comprises a usual battery 40, one terminal of which is connected to the midpoint of the primary winding 42 of what may be called a generating transformer, and the other terminal of which is connected to the coil 44 and moving contact 46 of a conventional vibrator 48. The two stationary terminals 50 and 52 of vibrator 48 are connected directly to the terminals 54 and 56 respectively of primary winding 42. Condensers 58 and 60 are preferably interposed between terminals 50 and 52 and the battery 42 to prevent arcing at the terminals 50 and 52 as the moving contact 46 successively makes and breaks contact therewith, as well as to smooth out the alternating wave form delivered by the circuit. As will be appreciated, the vibrator coil, when energized through auxiliary contact 49, pulls contacts 46 and 49 to an opposite position, de-energizing itself. A spring 47 thereafter returns the contacts to the illustrated positions, re-energizing coil 44.

Where the use of the system is confined to rail systems utilizing a direct current track supply, the vibrator frequency may be of substantially any desired value. Preferably, however, the system is arranged for universal use, that is, in connection with railways having either direct or alternating current track sources. Accordingly, the vibrator is preferably adjusted to have an output, the fundamental and harmonic frequencies of which differ from the fundamental and harmonic frequencies of the trackway sources. Thus, the carrier current is ineffective to cause false operation of the track relays.

The adjusting circuit includes the secondary 62 of the generating transformer 43, and the two inductively independent primary windings 64 and 66 of the delivery transformers 68 and 70. The adjusting circuit also includes a condenser 72 connected directly to one terminal of winding 62 and connected to the opposite terminal through an inductance 74. A second inductance 76 is connected between inductance 74 and winding 64.

The secondary windings 78 and 80 of transformers 68 and 70, respectively, are electrically connected to rails 18 and 20 by brushes 82, 84 and 86 and 88, respectively, each of which is electrically connected to an associated pilot wheel. Brushes 82 and 84 may be considered as electrically connected to the front pilot wheels 22 of vehicle 10 and brushes 86 and 88 may be considered as electrically connected to the rear pilot wheels 24.

With the above connections, it will be seen that secondary windings 78 and 80 are electrically connected together to form a local circuit which extends, for example, from one terminal of winding 78 through brush 84, a pilot wheel 22, track 2, a pilot wheel 24, brush 88, winding 80, brush 86, the other pilot wheel 24, rail 18, the other pilot wheel 22, and thence through brush 82 to the other terminal of winding 78. As indicated by the plus and minus signs adjacent the windings 78 and 80, the connections for these windings are such that the voltages of winding 78 and 80 are cumulative in the above circuit, so that for purposes of breaking down rail resistance, the voltage available for this purpose is the sum of the individual voltages in windings 78 and 80.

Although windings 78 and 80 are electrically connected, as above stated, they are magnetically and inductively independent. Accordingly, even though in passing from one track section to another, brushes 82 and 84 momentarily occupy one section, and brushes 86—88 occupy an adjacent section, no possibility is present of a false transfer of energy between the sections.

It will be noted that two separate and distinct shunt paths are provided for the current flowing from the secondary winding of the track transformer 32, one shunt path including the two pilot wheels 24 and the winding 80, and the other shunt path including the two pilot wheels 22 and the winding 78. The windings 78 and 80 are preferably formed of relatively heavy copper wire, so that the resistance thereof is relatively low. Accordingly, both shunt paths present a resistance substantially lower than the resistance of track relay winding 36.

As will be appreciated, under conditions where a very high contact resistance is encountered between the pilot wheles and the rails, the secondary windings 78 and 80 may be considered as substantially open circuited. Under such circumstances, the current and voltage relations in the adjusting circuit are determined substantially entirely by the relation between the capacitance of the circuit as represented by condenser 72, and the inductance thereof as represented by the inductance of winding 62, inductances 74 and 76, and windings 64 and 66. In accordance with the present invention, these relations between capacitance and inductance are such as to cause the impression across windings 64 and 66 of a voltage substantially in excess of the voltage impressed across winding 62.

With this arrangement, under substantial open circuit secondary conditions of the delivery transformers, a relatively high voltage is impressed across the primaries thereof, which is reflected as a correspondingly relatively high voltage across the secondaries 78 and 80, which relatively high voltage is sufficient to break through the oxide layer, ionizing the air between the rims of the pilot wheels and the rails and forming a relatively low resistance conducting path.

Upon formation of this relatively low conducting path, the windings 78 and 80 may be considered for purposes of description as being short circuited. The resultant current flowing in each of the secondary windings 78 and 80 modifies the previously existing relation between capacitance and inductance in the adjusting circuit and materially reduces the voltage impressed across the primary windings 64 and 66, which correspondingly reduces the voltage induced in the secondary windings 78 and 80. Thus, as long as conducting conditions exist in the delivery circuit, the voltages developed in the secondary windings are of a very low value and preferably are so selected as to approximate the voltage impressed across the rails from the track transformer 32.

The formation of the low resistance shunting paths as just mentioned also serves to substantially short circuit the track relay 36, which accordingly drops to the de-energized position, in consequence of which the usual signaling functions occur.

Stated in another way, the system is so designed that the output of the vehicle carried battery 40 is more or less uniform, the elements of the adjusting circuit acting to produce a high voltage in the adjusting circuit under poor shunting conditions, and to produce a relatively low voltage in such circuit under good shunting conditions.

Preferably, in order to maintain the efficiency of the system at as high a value as possible, all of the transformers are designed to have a low leakage reactance. In certain instances, however, it is found desirable to supplement the voltage adjustments provided in the adjusting circuit, by using high leakage reactance delivery transformers. As will be appreciated, the rise in secondary voltage under poor shunting conditions may thus be increased.

In the modified embodiment of Figure 2, the arrangement is generally similar to that described with reference to Figure 1, the similarity being indicated by the corresponding reference characters. In Figure 2, however, the condenser 72 and inductance 74 are replaced by a tertiary winding 90 associated with transformer 43a, which is short circuited upon itself through a condenser 92. Winding 90 is thus magnetically coupled to windings 42a and 62a and by proper adjustment, serve to introduce capacitance into the adjusting circuit, the effective value of which compensates for the elimination from the circuit of condenser 72 and inductance 74. The performance of the system of Figure 2 is thus functionally the same as the performance of the system of Figure 1. No further description of the arrangement of Figure 2 is therefore considered necessary.

In the arrangement shown in Figure 3, the system duplicates that of Figure 1 with the exception that an additional circuit is formed between the brushes 82b and 88b, which circuit includes conventional tuning elements illustrated as a condenser 94 in closed circuit relation to the secondary winding 96 of a transformer. The primary winding 98 is included in the just mentioned additional circuit. Winding 98 is of low resistance and the relation between capacitance and inductance in the circuit 89 is such as to present a high impedance to current of the frequency delivered by transformer 43 but to present a minimum impedance to current of the frequency delivered by the track transformer, as well as a minimum resistance to a direct current track supply. Accordingly, the bridging circuit 89 may be substantially disregarded so far as concerns the circulation of current from transformer 43. After breakdown of the rail contact resistance, however, an extremely low resistance shunt path between rails 18 and 20 is provided for the current from track transformer 32, which circuit extends from rail 18 through brush 82, winding 98 and thence through brush 88 and the associated pilot wheel to rail 20. This circuit, being independent of the two windings 78 and 80, is unaffected by the resistance thereof and provides an effective shunt to divert current from track relay 36b and reliably causes the de-energization thereof.

Referring now to Figures 5 and 6, it is frequently desirable in the construction of combined road and rail vehicles, to utilize pilot axles which do not rotate with the associated pilot wheels. In such instances, the present invention provides a slip ring construction to conduct current between the pilot wheels and the secondaries of the delivery transformers. In Figures 5 and 6, brush 82c is carried in a brush holder 100, which in turn is supported from the pilot axle 102 by a bracket 104. Brush 82c engages the periphery of a slip ring 106, which is secured upon and for rotation with the pilot wheel 22c by studs 108 which project inwardly from the inner face thereof. It is further desirable in certain instances, to introduce a resilient construction into the pilot wheels, to simplify the construction of the necessary bearings between the pilot wheels and the pilot axles. A conventional method of providing this resiliency includes the insertion between the rim and the hub of the pilot wheel of a resilient ring, formed, for example, of vulcanized rubber or the like. In such instances, it accordingly becomes desirable to provide an independent connection between the rim of the pilot wheel and the slip ring, which independent connection is illustrated in Figures 5 and 6 as comprising the jumper 110, one end of which is connected to the pilot wheel adjacent the rim thereof and the other end of which is permanently connected to the slip ring 106. It will be appreciated, although the slip ring assembly has been described with reference to a particular one of the pilot wheels, that the construction for all pilot wheels may be duplicated.

In practice, track shunting systems embodying the present invention as described hereinbefore have been found to effectively shunt the track relays under a wide variety of operating conditions, including conditions of relatively heavy rust deposits, as well as deposits of ice and other foreign matter. The system of the present invention may be designed for use without change upon track sections utilizing either direct current or alternating current track energy, and may be manufactured and assembled for a fraction of the cost of devices heretofore proposed so far as the present applicant is aware. It will be understood that, although specific embodiments of the invention have been described in detail, various modifications in the form, number and arrangement of the elements thereof, may be made within the spirit and scope thereof.

What I claim is:

In a system for improving the shunting of track circuits by breaking down rail contact resistance, and embodying a source of track circuit energy, the combination of a first connection having its terminals electrically connected to the rails of said track and including a source of periodically varying current; a second connection having its terminals electrically correspondingly connected to said rails and forming with said first connection a local circuit for said periodically varying current; and a bridging connection extending from one terminal of said first connection to an opposite terminal of said second connection, said bridging connection being arranged to act as a choke to the frequency of said current, but to present a low impedence to said track circuit energy.

JAMES MOORE EVANS.